US006954356B1

(12) United States Patent
Lam

(10) Patent No.: US 6,954,356 B1
(45) Date of Patent: Oct. 11, 2005

(54) KEYBOARD SLED WITH ROTATING SCREEN

(75) Inventor: Lawrence Lam, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 10/896,153

(22) Filed: Jul. 20, 2004

Related U.S. Application Data

(63) Continuation of application No. 09/844,543, filed on Apr. 27, 2001, now Pat. No. 6,795,304.

(51) Int. Cl.⁷ .............................................. G06F 1/16
(52) U.S. Cl. ..................................... 361/683; 361/679
(58) Field of Search ............................... 361/679, 683, 361/686, 680

(56) References Cited

U.S. PATENT DOCUMENTS

| | | | | |
|---|---|---|---|---|
| 5,841,424 A | * | 11/1998 | Kikinis | ........................ 345/168 |
| 5,949,643 A | * | 9/1999 | Batio | ........................... 361/681 |
| 6,181,284 B1 | * | 1/2001 | Madsen et al. | ............. 343/702 |
| 6,185,095 B1 | * | 2/2001 | Helot et al. | .................. 361/686 |

2002/0102946 A1 * 8/2002 SanGiovanni

* cited by examiner

Primary Examiner—Yean-Hsi Chang
(74) Attorney, Agent, or Firm—Wagner, Murabito & Hao LLP

(57) ABSTRACT

A keyboard sled adapted to communicatively interact with a portable computer system. In one embodiment, the keyboard sled is comprised of an integral receiving portion adapted to mechanically and electronically receive a portable computer system. An interface connector is disposed within the receiving portion and adapted to provide a communicative link between the keyboard sled and a portable computer system, when a portable computer system has been inserted in the receiving portion. The keyboard sled further has at least one mounting hook disposed within the receiving portion for providing positive retention of a portable computer system when coupled with the keyboard sled. A keyboard portion also present on the keyboard sled and also coupled with the interface connector provides input keys. The keyboard sled is also comprised of an integral data storage access slot which is adapted to provide access to a data storage device receptacle of the portable computer system. The keyboard sled also adds input functionality to the portable computer system.

26 Claims, 9 Drawing Sheets

KEYBOARD SLED WITH ROTATING SCREEN

This is a continuation of application(s) application Ser. No. 09/844,543 filed on Apr. 27, 2001 now U.S. Pat. No. 5,795,304 which is hereby incorporated by reference to this specification.

FIELD OF THE INVENTION

The present invention relates to portable computer systems. More particularly, the present invention provides an mechanism for receiving portable computer systems and which provides user interoperability to the portable computer system.

BACKGROUND OF THE INVENTION

Continued advancements in technology have enabled the further miniaturization of the components required to build computer systems, creating new categories of computer systems. One of the newer categories of computer systems developed has been the portable, hand held, or "palmtop" computer system, referred to as a personal digital assistant or PDA. Other examples of a palmtop computer system include electronic address books, electronic day planners, electronic schedulers and the like. Many corporations have developed and are currently marketing their individual PDAs.

A palmtop computer system is a computer that is small enough to be held in the user's hand and as such is "palm-sized." As a result, palmtops are readily carried about in the user's briefcase, purse, and in some instances, in the user's pocket. The palmtop computer, being inherently lightweight by virtue of its size, is therefore exceptionally portable and convenient.

While the continued miniaturization of computer systems enables a user to now carry in their pocket the equivalent of a computer system that once occupied an entire room, it is the miniaturization that has also reduced some of the functionality of the palmtop computer system. To support the diminutive form factor of the palmtop computer, certain functions and components normally associated with full sized computers have been reduced or eliminated.

One of the components whose functionality has been reduced is the input device or keyboard. To comply with the diminutive form factor, a full sized keyboard is not employed. A handwriting recognition system was developed to provide a way for a user to input alphabetic and numeric characters into the portable computer system. To input a numeric or alphabetic character, a user would be required to physically perform, upon a handwriting recognition pad, a specific writing stroke or a combination of writing strokes. The writing stroke is mandated by the developer of the handwriting recognition system, and as such, a portable computer system manufactured by one company may have different writing strokes than another portable computer system manufactured by a different company. Accordingly, a user would need to memorize the writing strokes for most of the alphanumeric characters, or at least have a writing stroke chart readily available to which to refer, before being able to enter data. While this attempt does provide an effective way for many users to input alphanumeric characters, it can be a somewhat slow process for others. As such, this method is not particularly well suited for a user who desires to enter substantial amounts of data.

In addition to the handwriting recognition system, as mentioned above, manufacturers also developed an alphanumeric touch screen. In this attempt to provide a way for a user to input data, a user activates a small screen that displays a graphical representation of a keyboard. Because of the small display screen utilized in the portable computer system, three separate representations, each consisting of portions of a full sized keyboard are generally necessary. For example, when a user was to input text, an alphabetic keyboard portion would be used. To input a letter, a user would touch, with an approved stylus or other screen touching device, the appropriate letter displayed on the viewing screen, thereby selecting that letter, and that letter would then be displayed on the viewing screen. A user would perform the same process for each letter.

Further, when that same user needed to input numerical data, the user would switch from the alphabetic keyboard to the numerical keyboard to enter the required numbers, and then switch back to the alphabetic keyboard to continue with the inputting of alphabetic data. When punctuation such as, e.g., an exclamation point is needed, the user was required to switch to the keyboard that contained the punctuation. While this attempt also provides an effective way for many users to input alphanumeric characters, it can be a somewhat slow process for others. As such, this method is not particularly well suited for a user who desires to enter substantial amounts of data.

In another attempt, a miniature keyboard was developed which was adapted into the form factor of the portable computer system. Unfortunately, because this miniature keyboard was so small, as were the keys, it was difficult to input data. Additionally, using any more than one finger at a time was difficult, given the tiny surface on which the keys were disposed. Further, because of the miniature size of the keyboard, a user would be required to contort their wrists and arms into uncomfortable positions to input the data.

SUMMARY OF THE INVENTION

Thus, a need exists for an apparatus that is coupled to and provides a convenient and simple way for a user to input data into a portable computer system. An additional need exists for an apparatus that meets the above listed objective and which provides full sized keyboard functionality to a portable computer system. An additional need exists for an apparatus which meets the above listed objectives and which provides for proper ergonomic positioning of the keyboard relative to the user.

These and other objects and advantages of the present invention will no doubt become obvious to those of ordinary skill in the art after having read the following detailed description of the preferred embodiments which are illustrated in the various drawing figures.

The present invention provides a sled device that is adapted to be coupled with a portable computer system and adds input capability to the device. The present invention further provides, in one embodiment, an apparatus that achieves the above listed functionality and which further provides normal sized inputting functionality to a portable computer system. The present invention further provides an apparatus that has the above listed functionality, and which provides full sized keyboard functionality to a portable computer system. Further, the present invention also provides an apparatus which achieves the above listed functionality, and which further provides the apparatus in an ergonomically designed configuration, thereby decreasing the occurrence of user discomfort. More specifically, the present invention provides an apparatus that is adapted to be communicatively coupled with a portable computer system. In one embodiment, the present invention includes a keyboard sled. The keyboard sled has a receiving portion configured to receive a portable computer system that is in a landscape (horizontal) orientation. The portable computer system has a display orientation controller for controlling the orientation of the display. In the present embodiment, the keyboard sled further has an interface connector disposed within the receiving portion and adapted to provide a communicative link between the keyboard sled and a portable computer system, when a portable computer system has been inserted into the receiving portion. The keyboard sled is also has a mounting hook within the receiving portion. The mounting hook is for providing positive retention of the portable computer system when coupled with the keyboard sled. The keyboard sled further has a keyboard portion coupled with the interface connector for providing input keys. In one embodiment, the keyboard portion has alphanumeric input keys. In another embodiment, the keyboard portion has numeric input keys. In present embodiment, the keyboard sled may also be configured with a wireless modem for communication functionality. In another embodiment of the present invention, the keyboard sled can be configured to provide gaming controls. The keyboard sled is has a data storage access slot disposed integral of the keyboard sled. The data storage access slot is adapted to provide access to a data storage device receptacle of the portable computer system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

An apparatus for receiving a portable computer system is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Exemplary Platform

The present invention is discussed primarily in the context of a portable computer system, such as a palmtop or personal digital assistant. However, it is appreciated that the present invention can be used with other types of portable electronic devices that have the capability to access some type of central device or central site, including but not limited to palmtop computer systems, pagers cellular phones, etc.

Figure 1A:
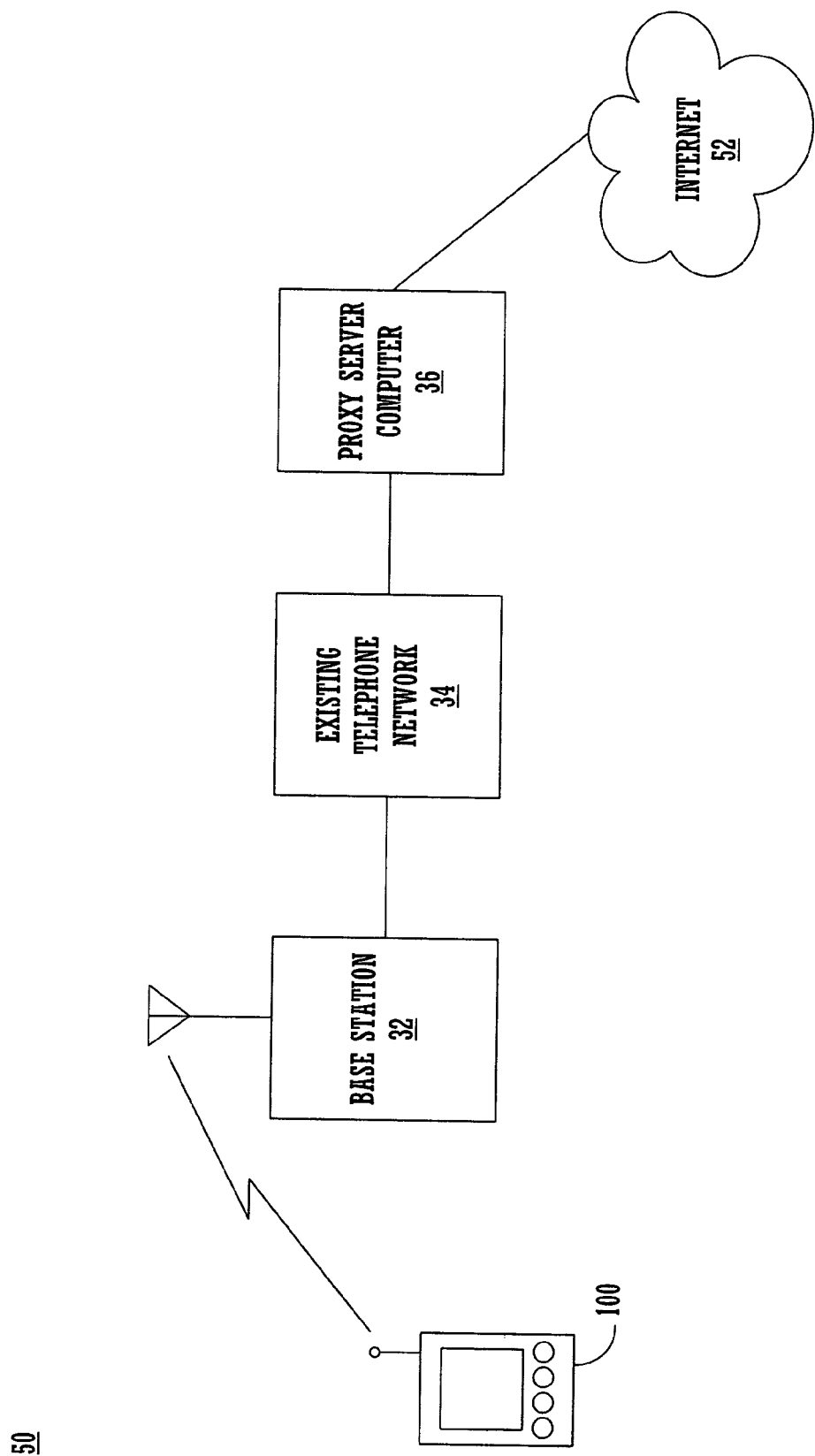
FIG. 1A is a block diagram of an exemplary network environment including a portable computer system, in accordance with one embodiment of the present invention.

FIG. 1A is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices which may have the ability to wirelessly communicate with a network. As such, for purposes of the present application, the terms "portable computer" and "mobile device" will be considered synonymous and will be used interchangeably.

Base station 32 can be both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol), WAP (Wireless Markup Protocol), and markup languages such as CML (Compact Markup Language), WML (Wireless Markup Language) which includes HDML (Handheld Device Markup Language), and XML (Extensible Markup Language) can be used by portable computer system 100 in the present embodiment.

It should be appreciated that one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. Additionally, in FIG. 1A, the existing telephone network could also be a packet-based network, utilized by some conventional portable computer systems. However, a wireless communication interface is utilized to communicate data and information between portable computer system 100 and base station 32. Furthermore, nearly any wireless network can support the functionality to be disclosed herein.

Figure 1B:
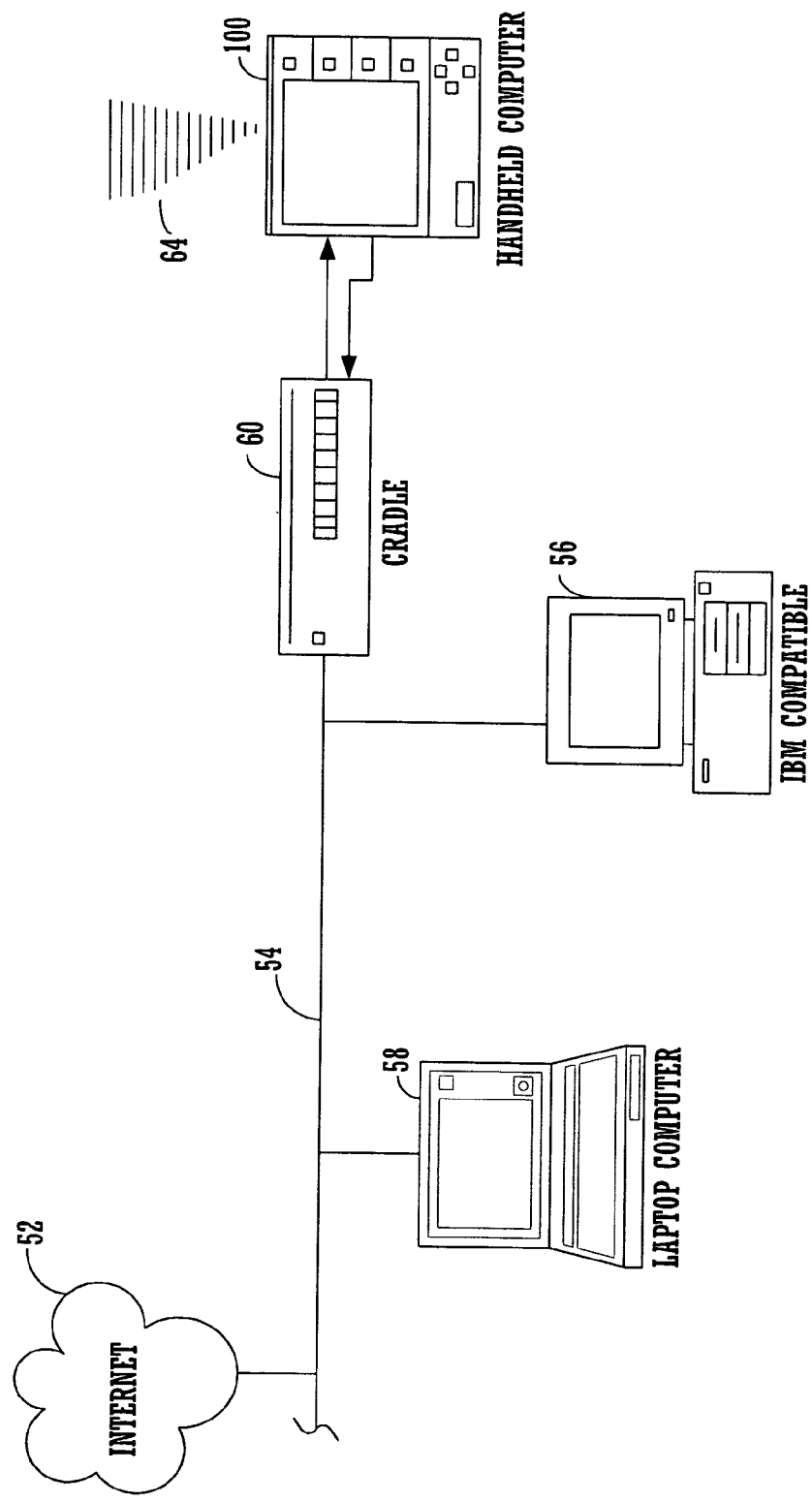
FIG. 1B is a block diagram of a portable computer system connected to other computers and the Internet via a cradle device, in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100. Cradle 60 provides an electrical and mechanical communication interface between bus 54 (and anything coupled to bus 54) and the computer system 100 for two-way communications. Portable computer system 100 may instead be coupled to host computer systems 56 and 58 via a wireless (radio) connection. Computer system 100 also contains a wireless infrared communication mechanism 64 for sending and receiving information from other devices. Additionally, in FIG. 1B, the existing telephone network could also be a packet-based network, utilized by some conventional portable computer systems.

With reference to both FIGS. 1A and 1B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
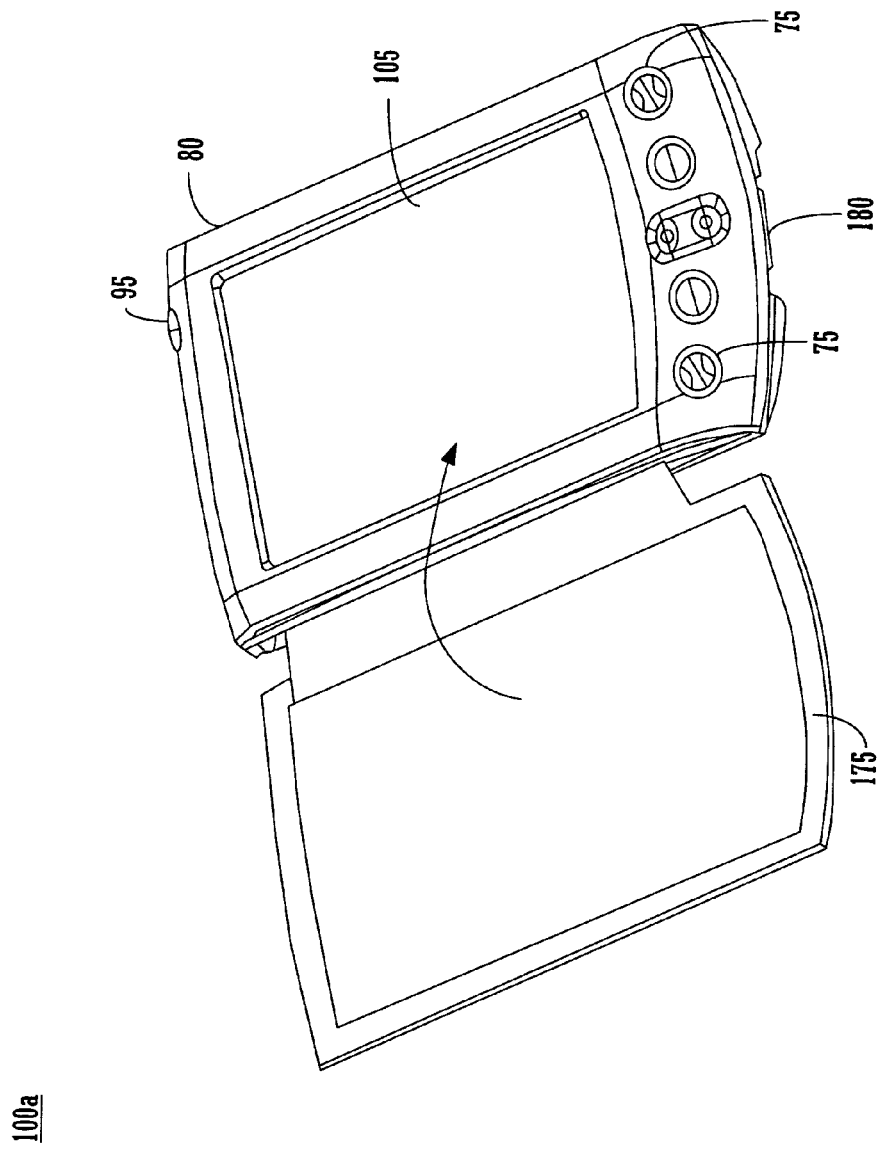
FIG. 2 is a front angled perspective view of a portable computer system configured with a removable front cover, upon which embodiments of the present invention may be practiced, in accordance with one embodiment of the present invention.

FIG. 2 is a front angled perspective view of the top face of a portable computer system 100, upon which embodiments of the present invention may be practiced. The top face 100a contains a flat panel display screen 105 surrounded by a bezel or cover. A removable stylus 80 is disposed along the right side edge of portable computer system, but by virtue of the angle of the illustration, is not visible. The display screen 105 is a touch screen able to register contact between the screen and the tip of stylus 80. Stylus 80 can be of nearly any material to make contact with screen 105. The top face 100a also contains one or more dedicated and/or programmable buttons 75 for selecting information and causing the portable computer system to implement functions. The on/off button 95 is also shown.

Still referring to FIG. 2, it should be appreciated that in one embodiment, portable computer system 100 may be configured with a removable front cover 175. Front cover 175 is adapted to provide protection against damage to display screen 105. Front cover 175 may rotate as shown by the arrow, about the axis, or hinge, as shown in FIG. 2. Also shown is communication interface connector 180. In one embodiment of the present invention, communication interface 180 is a serial communication port, but could also alternatively be of any of a number of well-know communication standards and protocols such as, e.g., parallel, SCSI (small computer system interface), Firewire (IEEE 1394) Ethernet, USB, or a bullet type communication interface.

Figure 3:
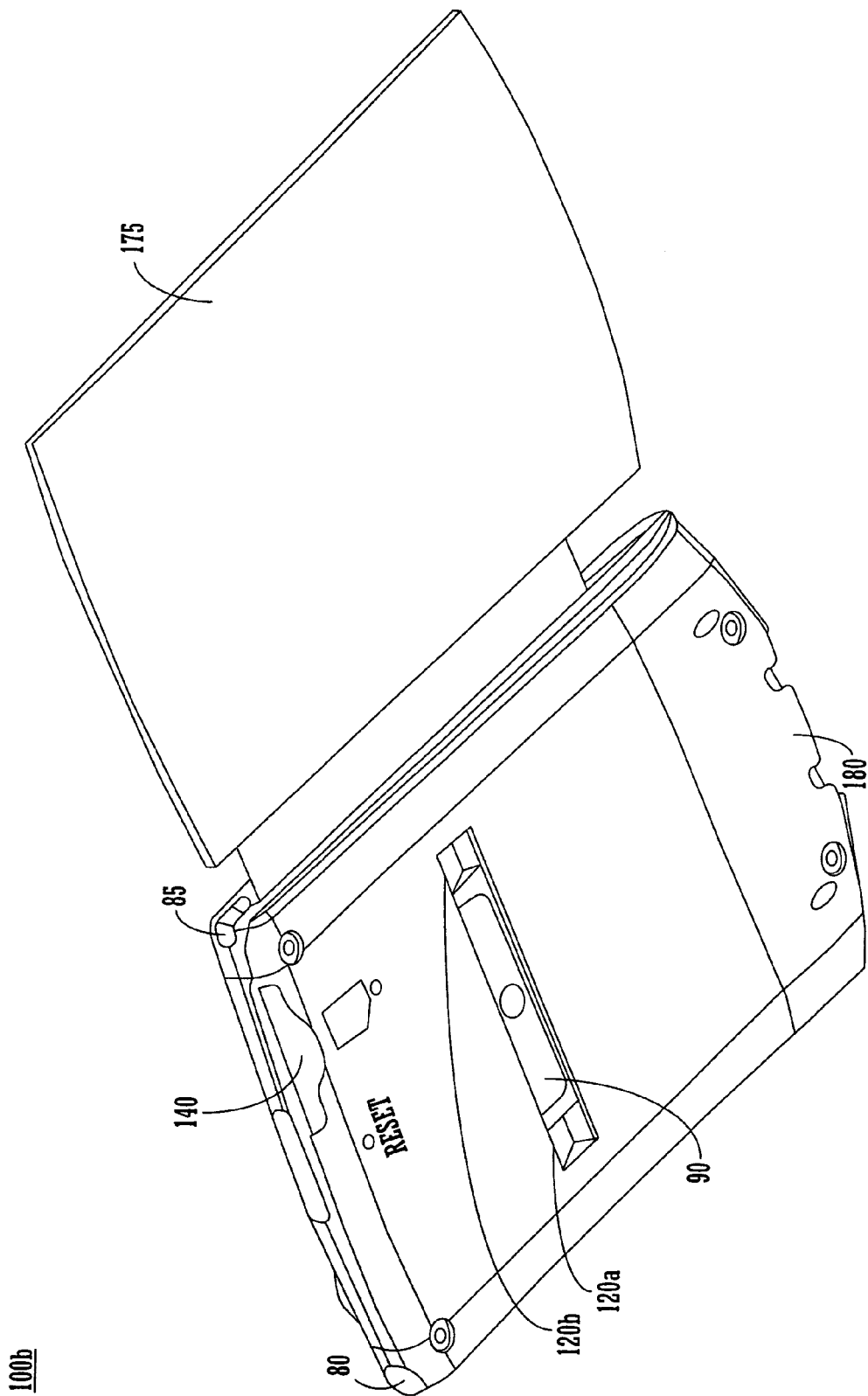
FIG. 3 is a rear angled perspective view of the portable computer system of FIG. 2.

FIG. 3 is a rear angled perspective view of the bottom side 100B of portable computer system 100 upon which embodiments of the present invention may be practiced. An extendible antenna 85 is shown as is stylus 80. Communication interface 180, analogous to communication interface 180 of FIG. 2 is shown. Battery storage compartment door 90 and portable computer system mounting hook receiving slots 120a and 120b are shown. Shown is front cover 175, analogous to front cover 175 of FIG. 2.

Still referring to FIG. 3, also shown is optional data storage device receptacle 140, adapted to receive optional data storage devices such as, e.g., secure digital (SD) cards, multimedia cards (MMC), memory sticks, and the like.

Figure 4:
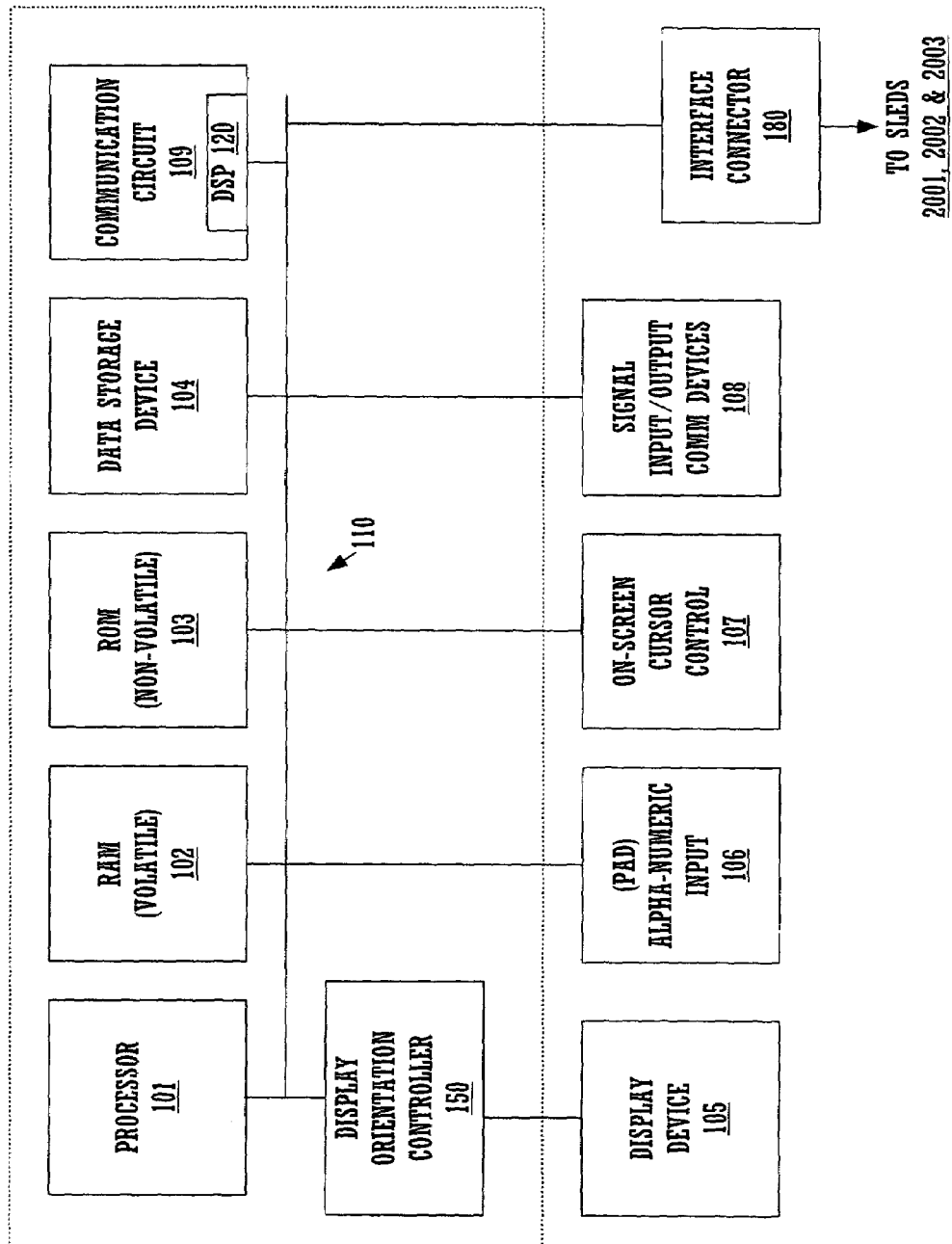
FIG. 4 is a block diagram of the circuits and components of the portable computer system of FIG. 2, in accordance with one embodiment of the present invention.

FIG. 4 illustrates circuitry of portable computer system 100. Portable computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., SD (secure digital) cards) coupled with the bus 110 for storing information and instructions. Device 104 can be removable. As described above, computer system 100 also contains a display device 105 coupled to the bus 110 for displaying information to the computer user.

With reference still to FIG. 4, computer system 100 also includes a signal transmitter/receiver device 108, which is coupled to bus 110 for providing a physical communication link between computer system 100, and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIGS. 2 and 3) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 4 is an optional alphanumeric input device 106 that in one implementation is a handwriting recognition pad and buttons. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. Display device 105 is suitable for generating graphic images and alphanumeric characters recognizable to the user. In the preferred embodiment, display device 105 is a flat panel display.

Still referring to FIG. 4, also shown is display orientation controller 150. Orientation controller 150 is configured to control the orientation of display screen 105, thereby providing both portrait type (vertical) and landscape type (horizontal) viewing enablement to portable computer system 100. In one embodiment of the present invention, orientation controller 150 is an automatic sensing controller, such that, regardless of the orientation of the display screen 105, the controller properly orients the data. In one example, when portable computer system is oriented in a portrait mode, the data displayed is in the usual and customary vertical mode. When the computer system is oriented in a landscape mode, the data displayed is reoriented to be readable, as in a vertical mode, but with the display horizontal.

In another embodiment of the present invention, display orientation controller 150 is a switch activated type controller. In the present embodiment, a dedicated and/or programmable button 75, (shown in FIG. 2), or a combination thereof, is/are configured to initiate reorientation of the display screen 105. In one example, a portable computer system 100, having viewable data, is rotated from a portrait (vertical) orientation to a landscape (horizontal) orientation. The viewable data appears in a sideways manner, analogous to a printed text page being held horizontally. A user would press programmable button(s) 75 which would activate display orientation controller 150, and the viewable data would be reoriented so as to be easily readable in a vertical manner, although the display screen is still in a horizontal mode. If the display screen is reoriented to a vertical mode, pressing programmable button(s) 75 again would orient the viewable data to the original vertical mode.

Figure 5:
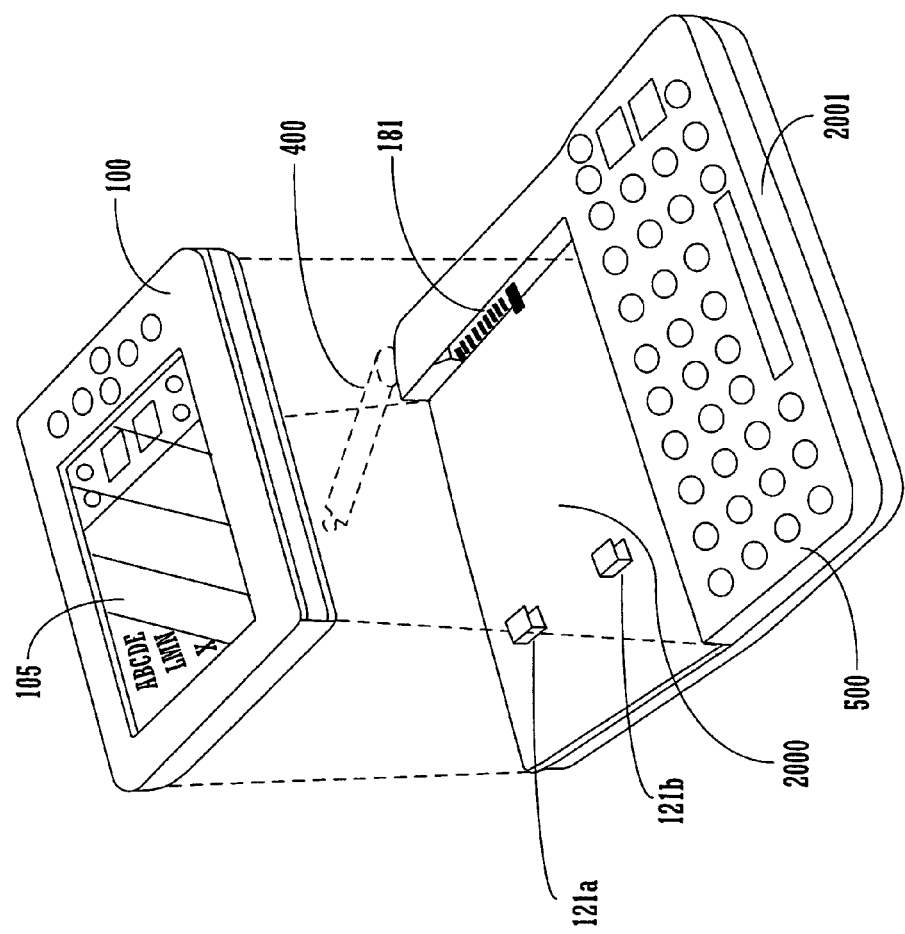
FIG. 5 is a front angled perspective view of a keyboard receiving sled, in accordance with one embodiment of the present invention.

FIG. 5 is a front angled perspective illustrated view of keyboard sled 2001, one embodiment of the present invention. Portable computer system 100, analogous to the portable computer system 100 of FIGS. 2 and 3 is disposed above keyboard sled 2001 and positioned to be coupled to keyboard sled 2001. In this embodiment, portable computer system 100 is oriented in a landscape (horizontal) mode. Because of display orientation controller 150, the data displayed on display screen 105 is easily readable.

In this embodiment of the present invention, keyboard sled 2001 is shown to include receiving portion 2000, which is adapted to receive a portable computer system in a landscape (horizontal) orientation. Also shown is interface connector 181, adapted to be coupled with interface connector 180 of portable computer system 100 (FIGS. 2 and 3), and configured to provide the communicative link between keyboard sled 2001 and portable computer system 100. Also shown are mounting hooks 121a and 121b, which are adapted to provide retentive functionality to keyboard receiving sled 2001. For example, when portable computer system 100 is coupled with keyboard sled 2001, mounting hooks 121a and 121b are disposed such that they are insertable into mounting hook receiving slots 120a and 120b of FIG. 3. This provides positive retention of 100 portable computer system, thereby preventing portable computer system 100 from becoming inadvertently disengaged from keyboard receiving sled 2001.

Still referring to FIG. 5, shown is keyboard portion 500, which in one embodiment of the present invention, is a QWERTY type keyboard having a full complement of keys. Keyboard 500 is disposed integral with keyboard sled 2001. It should be appreciated that because keyboard sled 2001 is configured to receive a portable computer system 100 in a landscape (horizontal) orientation, it has enabled the development of a larger sized keyboard with larger sized keys, which therefore provides for improved ergonomics.

In another embodiment of the present invention, keyboard portion 500 may be configured as a half keyboard. The components, functions and processes that comprise a half keyboard are described in detail in the following: "One-Handed Keyboard," U.S. Pat. No. 5,288,158 issued Feb. 22, 1994 by Matias, Edgar, all of which is incorporated herein by reference.

It should be further appreciated that in another embodiment of the present invention, keyboard sled 2001 may be configured with a wireless modem (see FIG. 8), such that wireless communication functionality is provided to keyboard sled 2001 and portable computer 100. Accordingly, an antenna, indicated by dotted line 400, for providing transceiving capabilities to keyboard sled 2001 would be included with keyboard sled 2001. As such, because of the full sized keyboard and communication functionality contained therein, responding to electronic mail is that much simpler, quicker, and easier.

Figure 6:
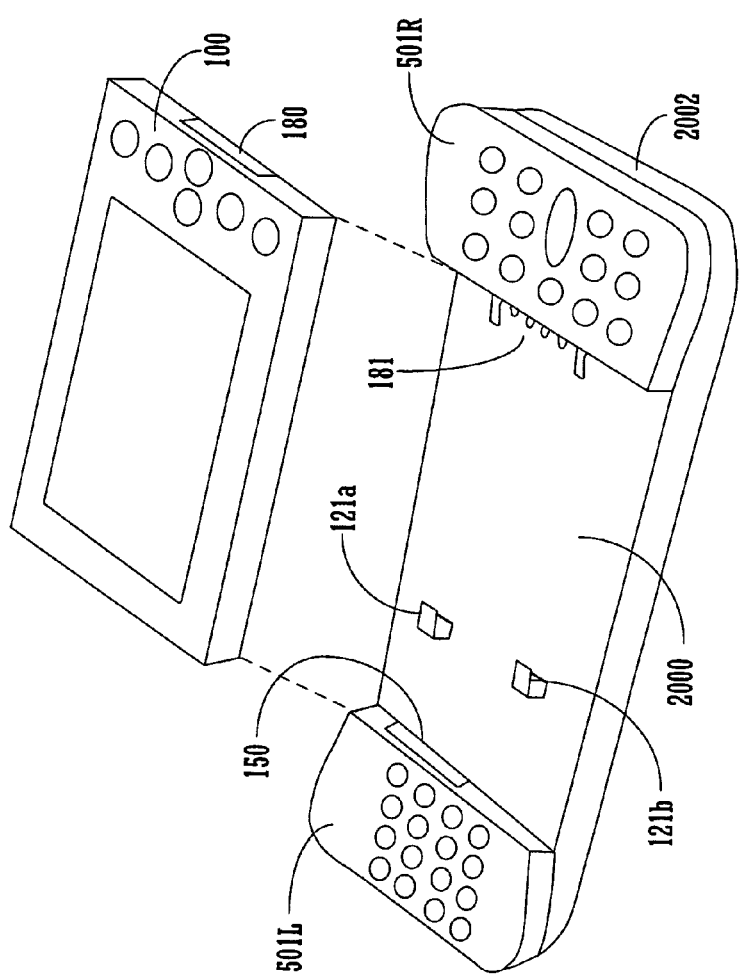
FIG. 6 is a front angled perspective view of a keyboard receiving sled, in accordance with another embodiment of the present invention.

FIG. 6 shows keyboard sled 2002 in a front angled perspective view, in another embodiment of the present invention. Shown is portable computer system 100, analogous to portable computer system 100 of FIGS. 2, 3. Portable computer system 100 is oriented in a landscape (horizontal) mode. Because of display orientation controller 150, the data displayed on display screen 105 is easily readable.

In this embodiment of the present invention, keyboard sled 2002 is shown to include receiving portion 2000, which is adapted to receive a portable computer system in a landscape (horizontal) orientation. Also shown is interface connector 181, adapted to be coupled with interface connector 180 of portable computer system 100 (FIGS. 2 and 3), which provides the communicative link between keyboard sled 2002 and portable computer system 100.

Also shown are mounting hooks 121a and 121b, which are adapted to provide retentive functionality to keyboard sled 2002. For example, when portable computer system 100 is coupled with keyboard sled 2002, mounting hooks 121a and 121b are disposed such that they are insertable into mounting hook receiving slots 120a and 120b of FIG. 3. This provides positive retention of 100 portable computer system, thereby preventing portable computer system 100 from becoming inadvertently disengaged from keyboard sled 2002.

Still with reference to FIG. 6, in this embodiment keyboard sled 2002 is configured with a data storage access slot 150 adapted to provide access to optional data storage receptacle 140 of portable computer system 100 of FIG. 3 when coupled with keyboard sled 2002. Data storage access slot 150 is a pass through channel which allows a user to access data storage device receptacle 140 of portable computer system 100. By providing access slot 150, which, in one embodiment of the present invention, is disposed upon the underneath side of keyboard sled 2002, a user is able to insert and remove data storage devices such as, e.g., SD or MMC or memory sticks into and out of data storage device receptacle 140 of portable computer system 100 without disengaging computer system 100 from keyboard sled 2002 to which it is coupled.

Also shown in FIG. 6 are left side keyboard portion 501L and right side keyboard portion 501R, respectively. It should be appreciated that a full complement of keys are present, although in this embodiment, the key pad is divided into two halves. By providing a split style keyboard, a proper ergonomic position is provided to a user.

It should be further appreciated that although not shown in FIG. 6, keyboard sled 2002 could be, in another embodiment of the present invention, configured with a wireless modem (see FIG. 8), such that wireless communication functionality is provided to keyboard sled 2002, analogous to the communication device of FIG. 5.

Figure 7:
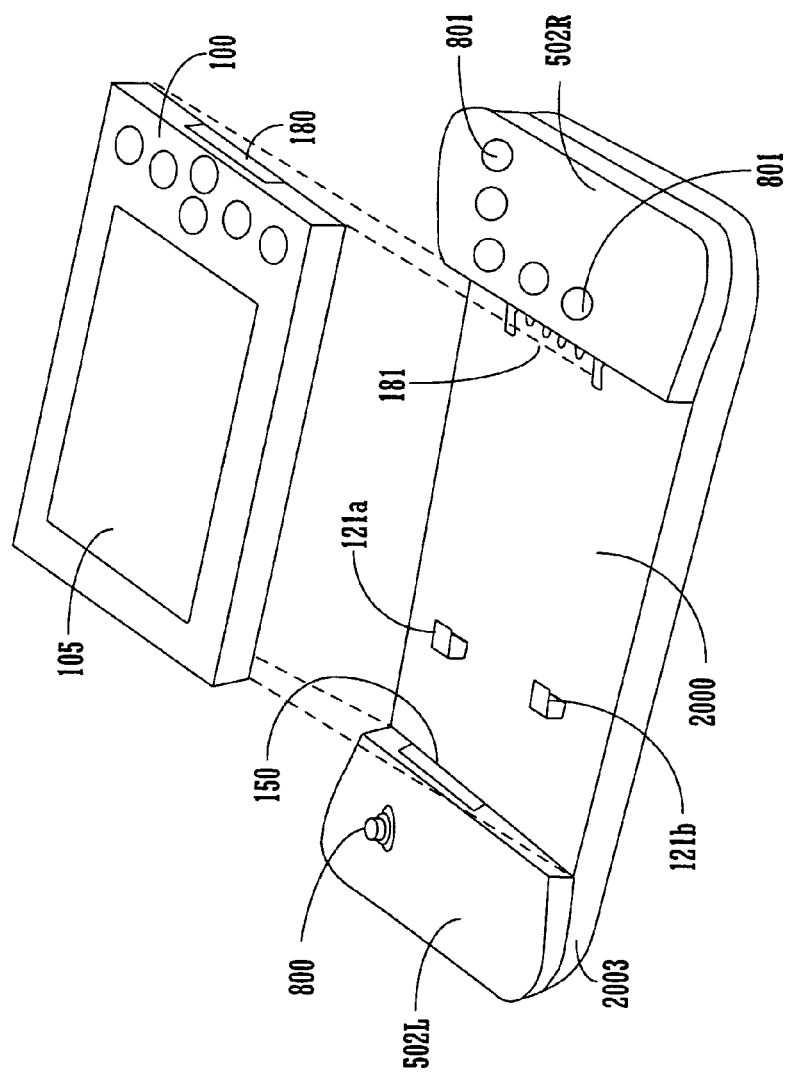
FIG. 7 is a front angled perspective view of a gaming receiving sled, in accordance with one embodiment of the present invention.

FIG. 7 shows keyboard sled 2002 configured as a gaming sled 2003, in a front angled perspective view, in another embodiment of the present invention. Shown is portable computer system 100, analogous to portable computer system 100 of FIGS. 2 and 3. Portable computer system 100 is oriented in a landscape (horizontal) mode. Because of display orientation controller 150, the data displayed on display screen 105 is easily readable.

In this embodiment of the present invention, gaming sled 2003 is shown to include receiving portion 2000, which is adapted to receive a portable computer system in a landscape (horizontal) orientation. Also shown is interface connector 181, adapted to be coupled with interface connector 180 of portable computer system 100 (FIGS. 2 and 3), which provides the communicative link between gaming sled 2003 and portable computer system 100.

Also shown are mounting hooks 121a and 121b, which are adapted to provide retentive functionality to gaming sled 2003. For example, when portable computer system 100 is coupled with gaming sled 2003, mounting hooks 121a and 121b are disposed such that they are insertable into mounting hook receiving slots 120a and 120b of portable computer system 100 of FIG. 3. This provides positive retention of 100 portable computer system, thereby preventing portable computer system 100 from becoming inadvertently disengaged from gaming sled 2003.

Still with reference to FIG. 7, in this embodiment gaming sled 2003 is configured with a data storage access slot 150 adapted to provide access to optional data storage receptacle 140 of portable computer system 100 of FIG. 3 when coupled with gaming sled 2003. Data storage access slot 150 is a pass through channel which allows a user to access data storage device receptacle 140 of portable computer system 100. By providing access slot 150, which, in one embodiment of the present invention, is disposed upon the underneath side of gaming sled 2003, a user is able to insert and remove data storage devices such as, e.g., SD or MMC or memory sticks into and out of data storage device receptacle 140 of portable computer system 100 without disengaging computer system 100 from gaming sled 2003 to which it is coupled. Accordingly, when games are stored within an SD (secure digital card) for example, to change from one game to another, a user would simply remove one gaming SD card and insert a new gaming SD card.

FIG. 7 also shows gaming sled 2003 having left side gaming portion 502L and right side gaming portion 502R. By providing a split style gaming sled, a proper ergonomic position is provided to a user. In the embodiment shown, a joystick type function knob 800 is shown as disposed upon left side gaming portion 502L. Multiple dedicated and/or programmable gaming function buttons 801 are shown as disposed upon right side gaming portion 502R.

It should be appreciated that multiple configurations of gaming buttons 801 is possible. In one embodiment, more than the shown number of buttons may be disposed upon gaming portions 502L and 502R. In another embodiment of the present invention, less than the shown number of buttons may be present. In yet another embodiment, dedicated and/or programmable gaming function buttons 801 may also be disposed upon the same side as joystick type function knob 800. In yet another embodiment, joystick type function knob 800 could be disposed upon right side gaming portion 502R and dedicated and/or programmable gaming buttons 801 may be disposed upon left side gaming portion 502L. Nearly any combination of buttons and/or knobs may be disposed on either side of gaming sled 2003.

It should be appreciated that in another embodiment of the present invention, gaming sled 2003 may be configured with a wireless modem (see FIG. 8), such that wireless communication functionality is provided to gaming sled 2003, analogous to the communication device of keyboard sled 2001 of FIG. 5.

It should be further appreciated that in another embodiment of the present invention, keyboard sled 2002 and gaming sled 2003 may be of a modular construction. In this embodiment of the present invention, a primary sled component having mounting hooks 121a and 121b, interface connector 181, and data storage access slot is present. The primary sled component is configured to receive and be coupled with keyboard halves 501L and 501R of FIG. 6 and gaming halves 502L and 502R of FIG. 7. Accordingly, a user who is entering data via keyboard halves, 501L and 501R, respectively, completes the desired data inputting, and now wishes to commence game playing. The user would remove the keyboard halves, and replace them with gaming halves 502R and 502L, without having to disengage portable computer system 100.

Figure 8:
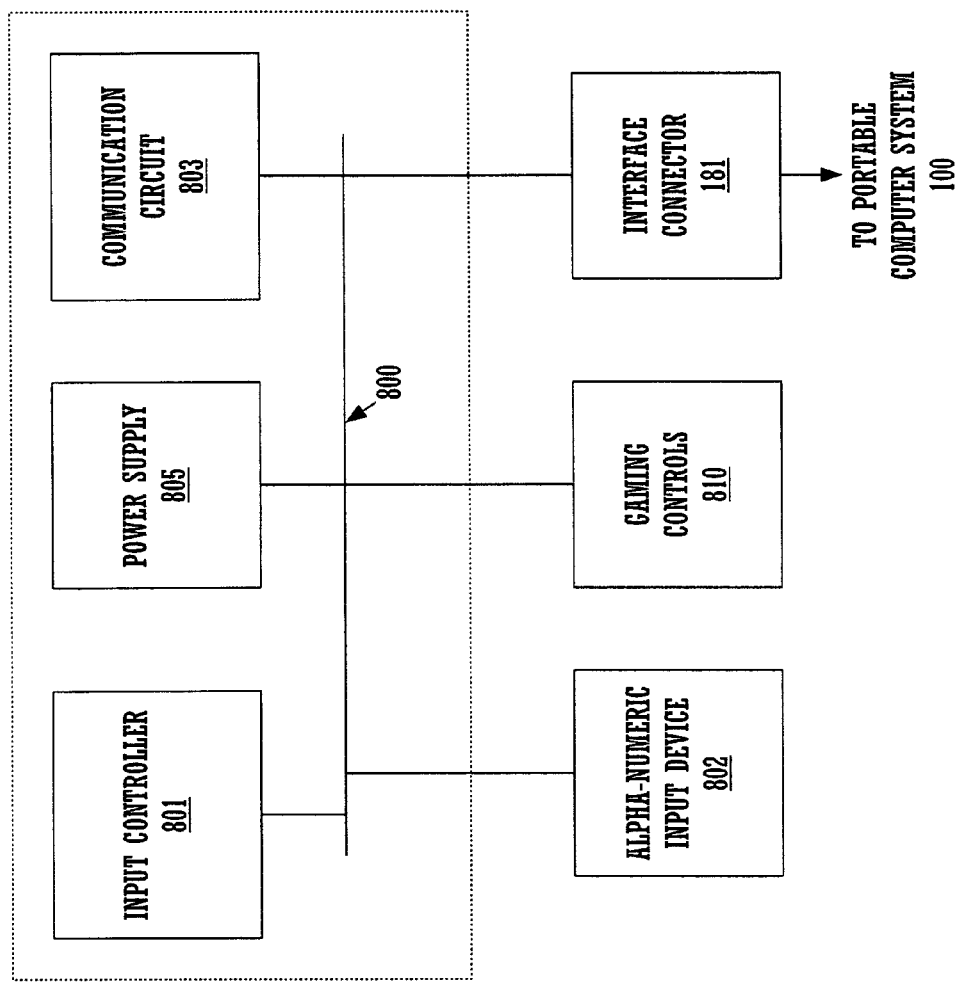
FIG. 8 is a block diagram of the circuits and components of the present invention, in accordance with one embodiment of the present invention.

FIG. 8 is a block diagram illustration of the circuitry and components of the keyboard and gaming sleds 2001, 2002, and 2003 of FIGS. 5, 6 and 7, respectively, which can be implemented on and/or coupled with a system board 2004 contained therein. System 2004 includes an address/data bus 800 for communicating information, an input controller 801 coupled with the bus for processing instructions received from alphanumeric input device 802 and gaming controls 810. In one embodiment, alphanumeric input device 802 is the keyboard 500 portion of keyboard receiving sled 2001 of FIG. 5. In another embodiment, alphanumeric input device 802 is keyboard 501L and 501R of keyboard receiving sled 2002 of FIG. 6.

Still referring to FIG. 8, system 2004 may also include a communication circuit 803, for providing wired and wireless communication functionality to keyboard and gaming sleds 2001, 2002, and 2003. Also included is optional power supply 805, which is configured to provide power to sleds 2001, 2002, and 2003. In one embodiment, sleds 2001, 2002, and 2003 are configured to operate utilizing the power supply retained within a portable computer system, which can decrease the normal operating time of the portable computer system. In another embodiment, sleds 2001, 2002, and 2003 are configured to operate utilizing their power supply. By providing an additional power supply, which may or may not be utilized at any given time, a user can extend the operating time of the portable computer system, such that the rate of recharging or replacing the power supply is reduced. Also shown is interface connector 181, of FIGS. 5, 6, and 7 which is configured to be coupled with interface connector 180 of portable computer system 100, so as to provide communication between portable computer system 100 and sleds 2001, 2002, and 2003.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A keyboard sled adapted to communicatively interact with a portable computer system, said keyboard sled comprising:
    a receiving portion adapted to receive said portable computer system;
    an interface connector disposed within said receiving portion and adapted to provide a communicative link said portable computer system when said portable computer system has been inserted in said receiving portion;
    a mounting mechanism disposed within said receiving portion, said mounting mechanism for providing positive retention on said portable computer system;
    a keyboard portion coupled with said interface connector and for providing input keys; and
    a data storage access slot adapted to provide access to a data storage device receptacle of said portable computer system.

2. The keyboard sled as recited in claim 1 wherein said receiving portion is configured to receive said portable computer system in a landscape (horizontal) orientation.

3. The keyboard sled as recited in claim 1 wherein said mounting mechanism is disposed within said receiving portion, such that when said portable computer system is coupled with said keyboard sled, said mounting mechanism is insertable in a mounting hook receiving slot of said portable computer system to provide positive retention of said portable computer system in said keyboard sled.

4. The keyboard sled as recited in claim 1 wherein said data storage access slot is configured as a pass through channel, such that when said portable computer system is coupled with said keyboard sled, said data storage device receptacle of said portable computer system in accessible without requiring the disengaging of said portable computer system from said keyboard sled.

5. The keyboard sled as recited in claim 1 wherein said keyboard portion comprises a complement of alphanumeric keys.

6. The keyboard sled as recited in claim 1 wherein said keyboard portion is a split keyboard having a left portion and a separately located right portion, said two portions comprising a complement of alphanumeric keys.

7. The keyboard sled as recited in claim 1 wherein said keyboard sled further comprises a wireless modem.

8. The keyboard sled as recited in claim 7 wherein said wireless modem is Bluetooth enabled.

9. The keyboard sled as recited in claim 1 wherein said portable computer system is a palmtop computer.

10. A gaming sled adapted to communicatively interact with a portable computer system, said gaming sled comprising:
    a receiving portion adapted to receive said portable computer system;
    an interface connector disposed within said receiving portion and adapted to provide a communicative link with said portable computer system when said portable computer system is inserted in said receiving portion;
    a mounting mechanism disposed within said receiving portion, said mounting mechanism for securing portable computer system when coupled with said gaming sled;
    a gaming controls portion coupled to said interface connector and for providing game control input; and
    a data storage access slot adapted to provide access to a data storage device receptacle of said portable computer system.

11. The gaming sled as recited in claim 10 wherein said receiving portion is configured to receive said portable computer system in a landscape (horizontal) orientation.

12. The gaming sled as recited in claim 10 wherein said interface connector enables communication between said gaming sled and said portable computer system, provided said portable computer system is coupled with said gaming sled.

13. The gaming sled as recited in claim 10 wherein said mounting mechanism is disposed within said receiving portion, such that when said portable computer system is coupled with said gaming sled, said mounting mechanism is insertable in a mounting hook receiving slot of said portable computer system, so as to provide positive retention of said portable computer system.

14. The gaming sled as recited in claim 10 wherein said data storage access slot is configured as a pass through channel, such that when said portable computer system is coupled with said gaming sled, said data storage device receptacle of said portable computer system in accessible without requiring the disengaging of said portable computer system from said gaming sled.

15. The gaming sled as recited in claim 10 wherein said gaming portion includes joystick functionality and function control buttons.

16. The gaming sled as recited in claim 10 wherein said keyboard sled further comprises a wireless modem.

17. The gaming sled as recited in claim 16 wherein said wireless modem is Bluetooth enabled.

18. A system comprising:
    a) a portable computer system having a display orientation controller;
    b) a sled comprising:
    a receiving portion adapted to receive said portable computer system;
    an interface connector disposed within said receiving portion and adapted to provide a communicative link between said sled and said portable computer system, when said portable computer system is coupled with said sled;
    a mounting mechanism disposed within said receiving portion, said mounting mechanism for securing said portable computer system;
    a keyboard portion coupled to said interface connector and for providing input keys; and
    a data storage access slot adapted to provide access to a data storage device receptacle of said portable computer system.

19. The system as recited in claim 18 wherein said receiving portion is configured to receive said portable computer system in a landscape (horizontal) orientation and wherein a display of said portable computer system is controlled by said display orientation controller.

20. The system as recited in claim 18 wherein said mounting mechanism is disposed within said receiving portion, such that when said portable computer system is coupled with said sled, said mounting mechanism is insertable into a mounting hook receiving slot of said portable computer system, so as to provide positive retention of said portable computer system in said sled.

21. The system as recited in claim 18 wherein said data storage access slot is configured as a pass through channel, such that when said portable computer system is coupled with said sled, said data storage device receptacle of said portable computer system is accessible without requiring the disengaging of said portable computer system from said sled.

22. The system as recited in claim 18 wherein said keyboard portion comprises a complement of alphanumeric keys.

23. The system as recited in claim 18 wherein said keyboard portion is a split keyboard, said split keyboard comprising a left side portion and a separately located right side portion, said two portions comprising a complement of input keys.

24. The system as recited in claim 18 wherein said sled further comprises a gaming control portion coupled to said interface connector and adapted to provide gaming input and control.

25. The system as recited in claim 18 wherein said sled further comprises a wireless modem.

26. The system as recited in claim 25 wherein said wireless modem is Bluetooth enabled.

\* \* \* \* \*